United States Patent [19]

Iwasa et al.

[11] Patent Number: 4,897,547

[45] Date of Patent: * Jan. 30, 1990

[54] GATE COUPLED INPUT CIRCUIT

[75] Inventors: Shigesato Iwasa, Harvard; Neal R. Butler, Acton; Jeff L. McClelland, Somerville, all of Mass.

[73] Assignee: Honeywell Inc., Minneapolis, Minn.

[*] Notice: The portion of the term of this patent subsequent to May 16, 2006 has been disclaimed.

[21] Appl. No.: 912,884

[22] Filed: Sep. 26, 1986

[51] Int. Cl.$^4$ .............................................. G01J 1/44
[52] U.S. Cl. .................... 250/338.1; 250/332; 250/338.3; 307/296 R; 330/296; 357/30
[58] Field of Search ...................... 250/330, 332, 338.1, 250/338.3, 349, 370.01, 370.14, 336.1; 357/25, 30, 32; 307/296 R, 296 A; 330/296, 51

[56] References Cited

U.S. PATENT DOCUMENTS

| | | | |
|---|---|---|---|
| 3,848,143 | 11/1974 | Millington et al. | 307/297 |
| 3,932,753 | 1/1976 | Stotlar | 250/332 |
| 3,961,280 | 6/1976 | Sampei | 330/40 |
| 3,987,317 | 10/1976 | Hongu et al. | 307/296 |
| 4,110,616 | 8/1978 | Porter et al. | 250/332 |
| 4,194,136 | 3/1980 | Butler | 307/296 |
| 4,341,012 | 7/1982 | Fripp et al. | 250/332 |
| 4,354,109 | 10/1982 | Gelpey et al. | 250/349 |
| 4,500,797 | 2/1985 | Nishimoto | 307/296 |
| 4,626,687 | 12/1986 | Nara et al. | 250/338.3 |
| 4,659,928 | 4/1987 | Tew | 250/332 |
| 4,691,104 | 9/1987 | Murata et al. | 250/338.3 |

FOREIGN PATENT DOCUMENTS 0131731 10/1980 Japan .............................. 250/338.3

OTHER PUBLICATIONS

"A Radiation-activated Sensor," J. C. Nirschl, *Nuclear Instruments and Methods 115*, No. 1, (Feb. 15, 1974) pp. 173–180.
"Integrated CCD-Bipolar Structure for Focal Plane Processing of IR Signals," W. Grant, R. Balcerak, P. Van Atts, J. Hall, *1975 International Conference on the Application of Charge-Coupled Devices*, San Diego, CA.

Primary Examiner—Janice A. Howell
Assistant Examiner—William F. Rauchholz
Attorney, Agent, or Firm—Charles J. Ungemach

[57] ABSTRACT

What is disclosed is a preamplifier used with each pyroelectric detector in an infrared imaging array system. The preamplifier transistor is a MOSFET transistor that can operate with zero volts between its source and gate terminals, and the preamplifier is biased either by a nonconducting diode that provides a high biasing impedance while the bias voltage is low enough to keep the diode below its conduction voltage; or an NPN transistor switch is periodically operated to place charge on the gate of the preamplifier transistor to maintain it at its bias level. When the bias transistor is not operated, the associated detector detects and a detector reading is taken from each detector in the array. NPN transistor switches can be manufactured consistently and their conduction level can be adjusted to balance the gain of all preamplifiers in the detector array.

24 Claims, 1 Drawing Sheet

GATE COUPLED INPUT CIRCUIT

The United States Government has rights in this invention pursuant to Contract No. DAAK 70-82-C-0268 awarded by the Department of the Army.

BACKGROUND

1. Field of the Invention

This invention relates to an infrared imaging system, and more particularly to a solid state imaging system utilizing pyroelectric detectors in an array. In our copending applications, Ser. Nos. 912,883 and 912,885, filed on Sept. 26, 1986, and both entitled "Gate Coupled Input Circuits" we disclose and claim alternate embodiments of the invention disclosed herein.

2. Background of the Invention

In the prior art it has been recognized that infrared imaging systems having few or no moving or fragile parts are desirable. Such infrared imaging systems should be very small because detector arrays would be fabricated on a single large scale integrated circuit chip along with associated electronics. Basically, two types of detectors are typically considered for such a solid state infrared imaging system. They are ferroelectric detectors which must be operated above the Curie temperature of the ferroelectric material, as is known in the art, and typically require that the detectors be heated. Above the Curie temperature the ferroelectric detectors have a cubic crystal structure that is very susceptible to polarization, but is not spontaneously polarized as it is below the Curie temperature. Thus, above the Curie temperature ferroelectric detectors require an external electric field in order to generate a signal. The other type of detector is a pyroelectric detector that is operated below its Curie temperature and exhibits a spontaneous dipole moment that produces an internal electric field, so an externally generated electric field is not required for these detectors to work.

In the prior art, infrared imaging systems utilizing ferroelectric detectors have been built. They have separate detector heating means and electric field biasing means for the detectors, and rows of detectors are sequentially enabled and connected to a common preamplifier. These preamplifiers are made up of a combination of integrated circuits and discrete components. The separate field biasing means and separate preamplifiers require increased space and increase the cost of the infrared imaging system.

To minimize circuit cost a single preamplifier is used to amplify the signal from all detectors in each row of an array of detectors. With this common preamplifier arrangement the fundamental sensitivity limit for each individual detector cannot be achieved.

Other infrared detector array arrangements have been provided in the prior art that do not need to be heated, but they have another problem They have to be cooled by a cryogenic cooler to temperatures of in the order of 77 Kelvin and below. In addition, such cryogenic cooling arrangements often utilize a bottle of a liquified gas such as nitrogen. This is bulky and the bottle must be changed frequently as the gas is used up.

Thus, there is a need in the art for an infrared imaging system having an infrared detector array that does not have to be heated or cooled (which requires power), does not require separate electric field detector biasing circuits, and does not utilize shared amplifiers.

SUMMARY OF THE INVENTION

The previously described needs of the prior art are met by the present invention. A pyroelectric detector array is utilized that operates well below its Curie temperature so does not require heating or an externally applied electric field. In addition, shared preamplifiers are not used to amplify the output from the detectors. Rather, a preamplifier is manufactured along with each detector of the pyroelectric detector array. Problems of not being able to manufacture discrete resistors of values needed for biasing the integrated preamplifiers are circumvented by biasing or providing a bias impedance by other innovative techniques.

DESCRIPTION OF THE DRAWING

The invention will be better understood upon reading the following detailed description in conjunction with the drawing in which.

DETAILED DESCRIPTION

Pyroelectric detectors are in essence temperature sensitive capacitors having two conductive plates, and the dielectric between the plates is a material such as lithium tantalate which is used in the preferred embodiment of the invention. Lithium tantalate has a Curie temperature of 620 Centigrade, well above the temperature at which the detector is operated. These pyroelectric materials have a dielectric constant that is temperature sensitive Thus, the detectors are variable capacitors that change capacitance with temperature. Lithium tantalate has a dielectric constant around 43 at room temperature. When these temperature sensitive capacitors (pyroelectric detectors) are placed in an array made up of rows and columns of a large number of detectors and an infrared (IR) image is focused on them by an appropriate IR lens system, the capacitance of each capacitive detector is varied by the intensity of the infrared energy impinging upon the detector. Thus, the voltage across each detector in an array directly represents a part of the infrared image that is focused on the array. When each of the detectors are connected to an amplifier, and the voltage across the detectors is indicated by an electrical signal output from the amplifiers, the output signal from the amplifier is a representation of the IR image and can be formatted and used to display the infrared image on a raster scan video display.

Figure 1:
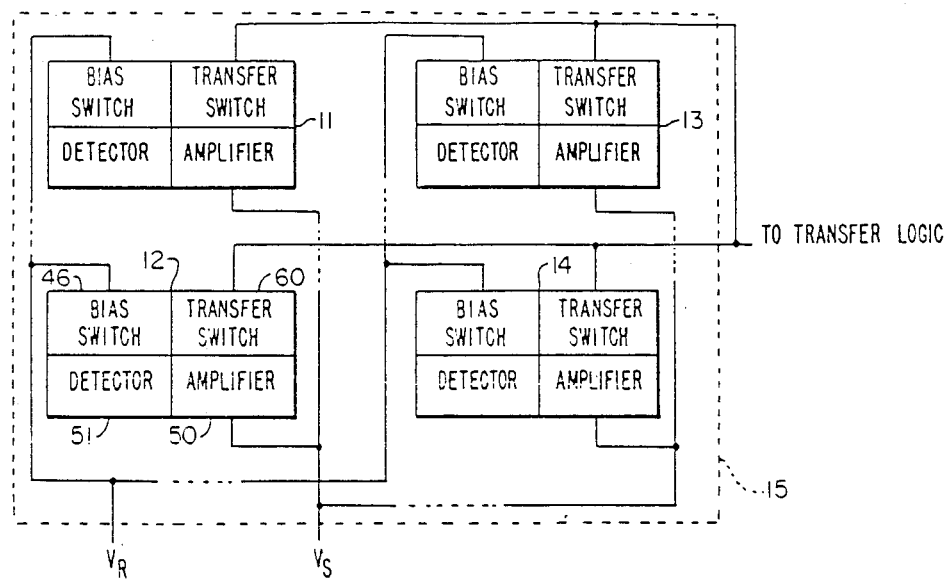
FIG. 1 is a block diagram of an infrared focal plane system utilizing the present invention.

In FIG. 1 is shown a schematic block diagram of an infrared focal plane array system that can provide a raster scan signal representing the infrared image focused on the detector array. An infrared lens system (not shown) made of germanium or other suitable material is used in a manner well known in the art to focus an infrared image on pyroelectric detector array 15 made up of rows and columns of individual detector array circuits such as represented as circuits 11 through 14. There can actually be thousands of these detector array circuits. Each representative detector array circuit 11 through 14 is made up of four elements each, which are those elements seen in FIGS. 2 and 3 and described in detail further in this specification With reference to FIG. 3, the bias switch is transistor 56, the transfer switch is transistor 60, the detector is capacitor 51, and the amplifier is transistor 50. However, the alternative embodiment of the detector array circuit shown in FIG. 2 may also be used in place of that shown in FIG. 3.

Figure 2:
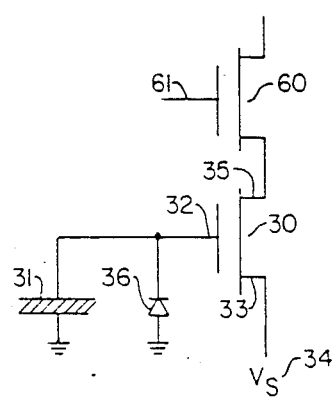
FIG. 2 is a schematic drawing of a pyroelectric detector connected to the input of an amplifier that is biased from a voltage supply through a non-conducting diode that appears in the circuit as a high impedance resistor.
Figure 3:
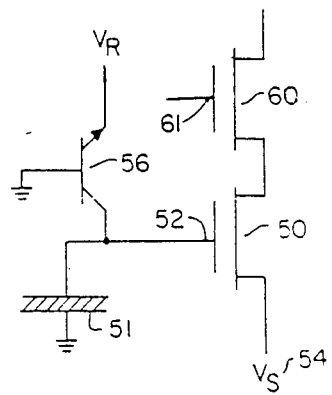
FIG. 3 is an alternative embodiment of the invention also showing a pyroelectric detector connected to the input of an amplifier and the two of them are biased by a transistor that can either be operated as a transistor switch to periodically apply voltage to the gate of the amplifier transistor and to the detector to bias same, or the transistor switch can instead be operated as a high impedance resistor.

In representative circuit 12 in FIG. 1, the detector amplifier and the transfer switch are metal-oxide-semiconductor field effect transistors (MOSFET) to the gate input of which is connected the pyroelectric detector. When the circuit of FIG. 2 is utilized, in circuits 11 through 14 there is no bias switch, but rather a diode used as a bias impedance; but when the circuit shown in FIG. 3 is used there is a bias switch which is an NPN transistor. It is easy to fabricate these transistors, diodes and the pyroelectric detectors as array 15 is fabricated as a whole.

In operation means that are not shown, but are well known in the art, are used for modulating or chopping the infrared image focused on the detector array 15. That is, the image is interrupted at a periodic rate The purpose that is served is to be able to discriminate between the infrared image signal and various background signals including noise and random temperature change within each of the representative circuits 11 through 14 in detector array 15. A reference signal including only the background signals is obtained from the detectors of array 15 while it has no infrared image focused thereon due to the modulating action, and a sample signal is obtained from the detector when it has an image focused thereon When the reference signal is subtracted from the sample signal the difference signal is only the image signal which is used to display the infrared image This modulating technique is used with the two embodiments of the invention described hereinbelow.

In operation of the present invention using the detector array circuit shown in FIG. 3 only, the sample signals are actually taken twice before bias switch transistor 56 of FIG. 3 is used to reset the bias on detector amplifiers 50 and on detector 51. This is done to remove uncertainty in the voltage that remains on the detectors and is minimized by operating bias switch transistor 56 a fewer number of times. This operation is described in greater detail further in this specification Using the detector array circuit shown in FIG. 2, bias is not periodically applied to the detector amplifier and detector. The reason for this is described in greater detail further in this specification.

In FIGS. 2 and 3 are shown two alternate embodiments of the invention. Preamplifiers are provided with each pyroelectric detector, and special means for biasing the preamplifiers and the detectors are provided in accordance with the teaching of the present invention. The detectors are periodically exposed to the infrared image focused on the detector array as previously described to get the reference and sample signals which are subtracted from each other as previously described to get the difference or image signal which is used to display the infrared image. In response to be being exposed to the infrared image the capacitance of the detectors changes and thereby changes the voltage at the gate input of the associated preamplifier to thereby change its conduction level. The conduction level of all preamplifiers, each of which reflects the portion of the infrared image focused on an associated detector in detector array 15, is read out in parallel and then converted to a scanning format to create a raster scan video signal of the infrared image focused on the array of detectors. In between being exposed to the infrared image the voltage across the detectors of all detector array circuits 11 through 14 is returned to a quiescent level by use of biasing means or the bias switch and the same read out is again used to obtain the reference signal. As previously described, the reference signal is subtracted from the sample signal to obtain the infrared image signal. The timing circuits used to read out detector array circuits 11 through 14 are not shown herein, but are well known in the art.

In FIG. 2 detector 31 is connected to gate 32 of MOSFET transistor 30, as described in the last paragraph, and a diode 36 is added in parallel with the capacitor detector 31 with its cathode connected to gate terminal 32. For correct operation of the circuit shown in FIG. 2 transistor 30 must have a depletion mode threshold in which it operates with zero volts between source terminal 33 and gate terminal 32. This is done so that transistor 30 can operate without having a large enough bias voltage on gate terminal 32 that will cause diode 36 to conduct. To bias transistor 30 without destroying the small signal created by detector 31, a large impedance must be connected between ground potential and gate 32 of transistor 30. In accordance with the teaching of this embodiment of the invention, the required large impedance is created by using diode 36. Fabrication of diodes is easily done with CCD manufacturing technology and they are made as part of the amplifier array. The diode 36 is not normally operated in a conducting state for any reason. A diode that only has a small voltage applied to it in a forward biased mode does not conduct because the voltage is insufficient to exceed the breakover level and go into conduction. Diode 36 is operated in this manner. At the non-conduction level the impedance of diode 36 in the forward bias direction is in the order of $10^{12}$ ohms which is the right value for biasing transistor 20 while not loading down the signal from detector 31. As may be seen in FIG. 2 the source terminal 33 is connected to a voltage supply ($V_s$) 34. On drain terminal 35 of transistor amplifier 30 is output an amplified electrical signal representing the portion of the infrared image impinging upon infrared detector 31. Transfer switch 60 is periodically operated to read out the amplified signal (video signal) from amplifier 30 that is formatted and used to display the infrared image on a raster scan video display. Transfer switch 60 is a transistor gate that is well known in the art so is not described in detail herein.

FIG. 3 shows the alternate embodiment of the invention for biasing a MOSFET preamplifier transistor 50. A bias switch transistor 56 is provided with every detector 51 that is an NPN transistor rather than a MOSFET transistor. This is done because these types of transistors are inherently well matched in manufacture of a large number of them, so their resistance is fairly well constant from transistor to transistor. This is necessary for the large detector array 15. Transistor 56 is periodically operated under control of external circuitry, 57 to periodically reset the bias charge on the gate of the MOSFET preamplifier transistor 50 and detector 51, and at the same time variations in MOSFET preamplifier transistors 50 can be compensated for by independently setting the on level of the transistor 56 in different ones of the detector array circuits 11 through 14. This helps to control noise increase in the circuit, and because an external circuit can be used to sense temperature changes and compensation can be applied through controlling the on conduction level of transistor 56.

To remove the switch noise caused by the operation of bias switch transistor 56 the sample signals read out of transistor 50 for two consecutive read outs when the infrared image is focused on detector 51 are subtracted from each other. As described in the last paragraph bias switch 56 is only operated before one of these two sample signal read outs, and the subtraction of the sample signal before which there was no bias switch operation from the sample signal before which there was a switch operation will yield the switch noise from the sample signal right after the switch operation so that the noise can then be removed by subtraction. This is done because for each of these two consecutive read outs the reset transistor 56 switching noise is constant, and the infrared signal sample is the difference of the two read outs. This technique can be utilized because the rate of change of the gate bias voltage is very slow compared to the read out rate of transistor 50. Thus, the first signal sample read out right after the switch operation is a first read out and the next signal sample read out is a reference signal read out. By subtracting these two read outs and then removing the noise, the signal-to-noise ratio of the infrared image signal is improved by removing the switch noise from the first signal sample.

In operation of a complete IR imaging system, the modulating means, not shown, periodically interrupts the infrared image and bias switch transistor 56 resets the bias voltage to both preamplifier 50 and detector 51 while there is no image focused on the detector In addition, while there is no infrared image focused on detector 51 the system next reads out the conduction level of preamplifier 50 to determine a reference level which includes miscellaneous circuit noise. Then the modulating means causes the infrared image to impinge on detector 51 and two read out samples are taken that are processed as described in the previous paragraph. The reference level read out is subtracted from the two sample signals read out and preprocessed to remove the bias switch noise.

The above described operation of FIG. 2 regarding signals read out and processed to remove noise also applies to the operation of FIG. 3 so is not repeated here The detector array circuit building block shown in FIG. 3 also includes a transfer gate transistor 60 that is used to read out the conduction level of detector 51 as described above with reference to FIG. 2. However, in FIG. 3 the emitter and collector of bias switch transistor 56 are connected between the gate inputs 52 and 61 of the two MOSFETs 50 and 60 as shown. As previously described, transfer switch 60 is a transistor gate that is well known in the art so is not described in detail herein, and is operated under control of external circuitry.

In a complete infrared imaging system the drain terminals of the transfer gate transistors 60 are each connected to a corresponding tap of a CCD shift register or another type of analog multiplexer. In operation the pyroelectric detectors accumulate signal and thereby set the operation level of their corresponding preamplifier transistor 50. Thus, preamplifier transistors 50 are enabled to be quickly read out in parallel to CCD shift registers (not shown) that are then shifted out at a slower rate to create a raster scan signal representing the infrared image.

While what has been described herein are the preferred embodiments of the invention, it will be understood that those skilled in the art may make many changes without departing from the spirit and scope of the invention. For example, while N-channel MOSFETs are disclosed herein, the circuits could be simply modified to operate with P-channel MOSFETs. In addition, other pyroelectric materials may be utilized as the dielectric of the detectors.

What is claimed as the invention is:

1. A circuit for use in a thermal imaging system comprising:
    an infrared detector for detecting an infrared signal impinging thereon,
    an amplifier having an input to which said detector is connected, and an output, said amplifier responding to said detector detecting an infrared signal to provide an amplified electrical signal representing said infrared signal at its output, and
    a diode connected in parallel with said detector, said diode always being operated in its nonconducting state and being used to bias both said detector and said amplifier, said nonconducting diode operating as a resistor having a resistance in the range of $10^{12}$ to $10^{15}$ ohms.

2. The invention in accordance with claim 1 further comprising:
    a transfer switch connected to the output of said amplifier, said transfer switch being operated to read out the amplified electrical signal representing said infrared signal impinging on said detector.

3. The invention in accordance with claim 2 wherein said detector is a temperature sensitive capacitor.

4. The invention in accordance with claim 3 wherein said detector is a pyroelectric detector utilizing lithium tantalate as the dielectric.

5. A circuit for use in a thermal imaging system comprising:
    an infrared detector for detecting an infrared signal impinging thereon,
    an amplifier having an input to which said detector is connected, and an output, said amplifier responding to said detector detecting an infrared signal to provide an amplified electrical signal representing said infrared signal at its output, and
    a bias bipolar transistor associated with and connected to the input of said amplifier, means for periodically operating said bias transistor to apply a voltage to said amplifier and said detector connected to the input thereof to charge them to a predetermined bias level, and said bias transistor then being disabled to permit said detector to detect said infrared signal impinging on it.

6. The invention in accordance with claim 5 further comprising:
    a transfer switch connected to the output of said amplifier, said transfer switch being operated to read out the amplified electrical signal representing said infrared signal impinging on said detector.

7. The invention in accordance with claim 6 wherein said detector is a temperature sensitive capacitor.

8. The invention in accordance with claim 7 wherein said detector is a pyroelectric detector utilizing lithium tantalate as the dielectric.

9. A circuit for use in a thermal imaging system comprising:

an infrared detector for detecting an infrared signal impinging thereon, an amplifier having an input to which said detector is connected, and an output, said amplifier responding to said detector detecting an infrared signal to provide an amplified electrical signal representing said infrared signal at its output, and a bias transistor associated with and connected to the input of said amplifier, said bias transistor being operated as a switch to act as a high impedance resistor and being used to bias both said detector and said amplifier, said bias transistor operating as to have an impedance in the range of $10^{12}$ to $10^{15}$ ohms.

10. The invention in accordance with claim 9 further comprising a transfer switch connected to the output of said amplifier, said transfer switch being operated to read out the amplified electrical signal representing said infrared signal impinging on said detector.

11. The invention in accordance with claim 10 wherein said detector is a temperature sensitive capacitor.

12. The invention in accordance with claim 11 wherein said detector is a pyroelectric detector utilizing lithium tantalate as the dielectric.

13. A thermal imaging system upon which an infrared image is focused to be detected and to generate an electrical signal representing said image, said system comprising an array of a plurality of infrared detectors upon which said infrared image is focused for detecting said infrared image impinging thereon, said array being organized in rows and columns of closely spaced detectors, an amplifier associated with each of said detectors, each said amplifier having an input to which said detector is connected, and an output, said amplifiers responding to their associated detectors detecting an infrared image to provide an amplified electrical signal representing said infrared image at its output, and a diode connected in parallel with each of said detectors, said diodes always being operated in a nonconducting state and being used to bias said detectors and said amplifiers, said nonconducting diodes operating as resistors having a resistance in the range of $10^{12}$ to $10^{15}$ ohms 14. The invention in accordance with claim 13 further comprising a transfer switch connected to the output of each of said amplifiers, said transfer switches being operated to read out the amplified electrical signal representing the portion of said infrared image impinging on each of said detectors.

15. The invention in accordance with claim 14 wherein said detectors are temperature sensitive capacitors.

16. The invention in accordance with claim 15 wherein said detectors are pyroelectric detectors utilizing lithium tantalate as the dielectric.

17. A thermal imaging system upon which an infrared image is focused to be detected and to generate an electrical signal representing said image, said system comprising:

an array of a plurality of infrared detectors upon which said infrared image is focused for detecting said infrared image impinging thereon, said array being organized in rows and columns of closely spaced detectors, an amplifier associated with each of said detectors, each said amplifier having an input to which its associated detector is connected and each amplifier having an output, each said amplifier responding to its associated detector detecting a portion of said infrared image to provide an amplified electrical signal representing said portion of said infrared image at its output, and a bias bipolar transistor associated with and connected to the input of each of said amplifiers, said bias transistors being periodically operated and applying a voltage to bias their associated amplifiers and detectors to a predetermined bias level, and said bias transistors then being disabled to permit said detectors to detect said infrared image impinging on the array of detectors.

18. The invention in accordance with claim 17 further comprising a transfer switch connected to the output of each of said amplifiers, said transfer switches being operated to read out the amplified electrical signal representing the portion of said infrared image impinging on each of said detectors.

19. The invention in accordance with claim 18 wherein said detector is a temperature sensitive capacitor.

20. The invention in accordance with claim 19 wherein said detector is a pyroelectric detector utilizing lithium tantalate as the dielectric.

21. A thermal imaging system upon which an infrared image is focused to be detected and to generate an electrical signal representing said image, said system comprising:

an array of a plurality of infrared detectors upon which said infrared image is focused for detecting said infrared image impinging thereon, said array being organized in rows and columns of closely spaced detectors, an amplifier associated with each of said detectors, each said amplifier having an input to which its associated detector is connected and each amplifier having an output, each said amplifier responding to its associated detector detecting a portion of said infrared image to provide an amplified electrical signal representing said portion of said infrared image at its output, and a bias transistor associated with and connected to the input of each of said amplifiers, said bias transistors being operated as a switch act as high impedance resistors and being used to bias said detectors and said amplifiers, said bias transistors operating as to have an impedance in the range of $10^{12}$ to $10^{15}$ ohms.

22. The invention in accordance with claim 21 further comprising a transfer switch connected to the output of each of said amplifiers, said transfer switches being operated to read out the amplified electrical signal representing the portion of said infrared image impinging on each of said detectors.

23. The invention in accordance with claim 22 wherein said detectors are temperature sensitive capacitors.

24. The invention in accordance with claim 23 wherein said detectors are pyroelectric detectors utilizing lithium tantalate as the dielectric.

* * * * *

UNITED STATES PATENT AND TRADEMARK OFFICE
CERTIFICATE OF CORRECTION

PATENT NO. : 4,897,547

DATED : January 30, 1990

INVENTOR(S) : Shigesato Iwasa, et al.

It is certified that error appears in the above-identified patent and that said Letters Patent is hereby corrected as shown below:

Column 8, Line 53, after the word "switch" insert -- to --.

Signed and Sealed this

Second Day of June, 1992

Attest:

DOUGLAS B. COMER

Attesting Officer

Acting Commissioner of Patents and Trademarks